United States Patent

[11] 3,626,158

[72] Inventor Murray D. Lawrence
Kings Park, N.Y.
[21] Appl. No. 16,491
[22] Filed Mar. 4, 1970
[45] Patented Dec. 7, 1971
[73] Assignee Potter Instrument Company, Inc.
Plainview, N.Y.

[54] ANTIJAMMING APPARATUS FOR MAGNETIC CARD READER

3 Claims, 2 Drawing Figs.

[52] U.S. Cl. 235/61.11 D, 179/100.2 P, 340/174.1 F
[51] Int. Cl. G06k 7/08, G11b 5/58
[50] Field of Search 235/61.114, 61.113, 61.12 N, 61.11 R; 340/174.1 F, 149 A; 179/100.2 P

[56] References Cited

UNITED STATES PATENTS

| | | | |
|---|---|---|---|
| 3,392,237 | 7/1968 | De Boo | 235/61.11 D |
| 2,866,637 | 12/1958 | Pendleton | 179/100.2 P |
| 3,370,157 | 2/1968 | Lockey | 235/61.11 R |
| 3,075,051 | 1/1963 | Pankratz | 179/100.2 P |
| 2,954,161 | 9/1960 | Negri | 235/61.11 C |

*Primary Examiner*—Thomas A. Robinson
*Assistant Examiner*—Robert M. Kilgore
*Attorney*—Laurence J. Marhoefer

ABSTRACT: A data processing system utilizes a magnetic transducer to sense a binary-coded pattern on a card or the like and produces an electrical output representative of the information encoded. The transducer contacts the card and there is a recess in the machine bed located directly beneath the transducer head to prevent jamming of a card between the bed and the transducer head.

INVENTOR
MURRAY D. LAWRENCE

ANTIJAMMING APPARATUS FOR MAGNETIC CARD READER

BACKGROUND AND SUMMARY OF THE INVENTION

The field of the present invention is data processing systems of the type in which data appears on separate information cards and more particularly arrangements utilizing a transducer to sense magnetic patterns on such information cards.

Data processing systems have come into widespread use to speed up a variety of operations such as accounting, inventory control, mathematical analysis, etc. In one such system, information is stored on individual cards in the form of magnetic marks on each card representative of letters, words, numbers, or other indicia.

In such systems the cards are passed under the transducer head at very high rates. Preferably, the cards are in contact with the transducer so that there is a very small space between the transducer head and the machine bed. Because of these factors it is easy for a card to jam between the transducer head and the bed of the machine. For example, a burr on a card edge or a bent card may wedge and stop the operation.

In order to obviate this difficulty and to achieve a nonjamming arrangement, the present invention, in accordance with one aspect thereof, utilizes a recess in the bed below the transducer head. The transducer deflects a damaged leading edge of a card into the recess. When the leading edge of the card passes beyond the recess and the transducer, the card bridges the gap so that it is in contact with the transducer when information is read from the card.

It is an object of the present invention to provide an improved data processing apparatus which is not susceptible to jamming.

In order to accomplish the foregoing and other objects of the present invention, the invention comprises the features hereinafter set forth in the specification and in the appended claims.

DESCRIPTION OF THE DRAWINGS

For a more complete understanding of the invention, reference should be made to the drawings wherein.

Like elements are identified by like numerals in the several views.

DESCRIPTION OF PREFERRED EMBODIMENTS

Figure 1:
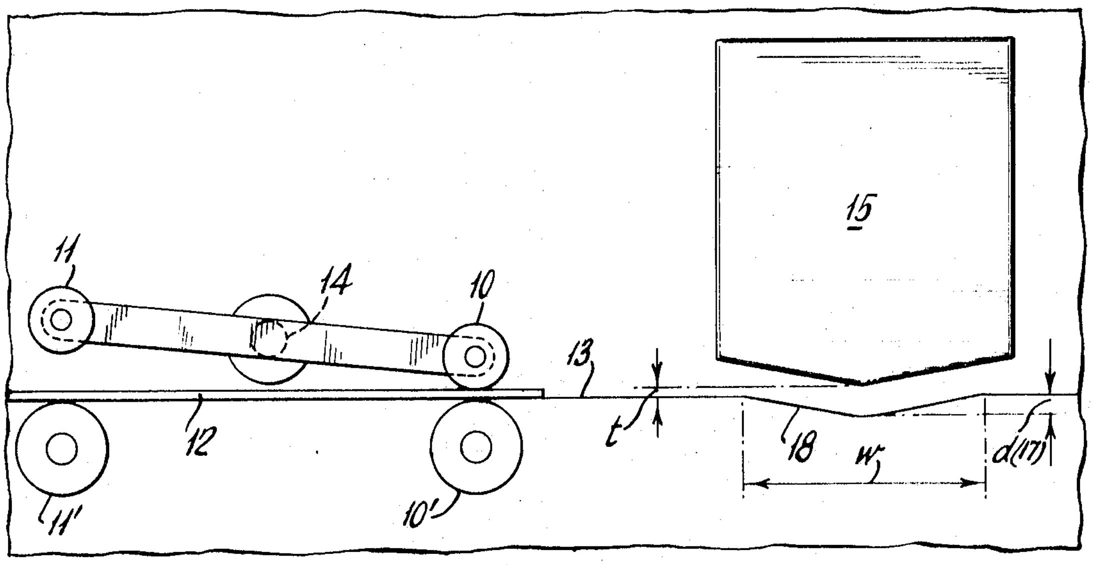
FIG. 1 is a front elevational view of an apparatus constructed according to the instant invention.
Figure 2:
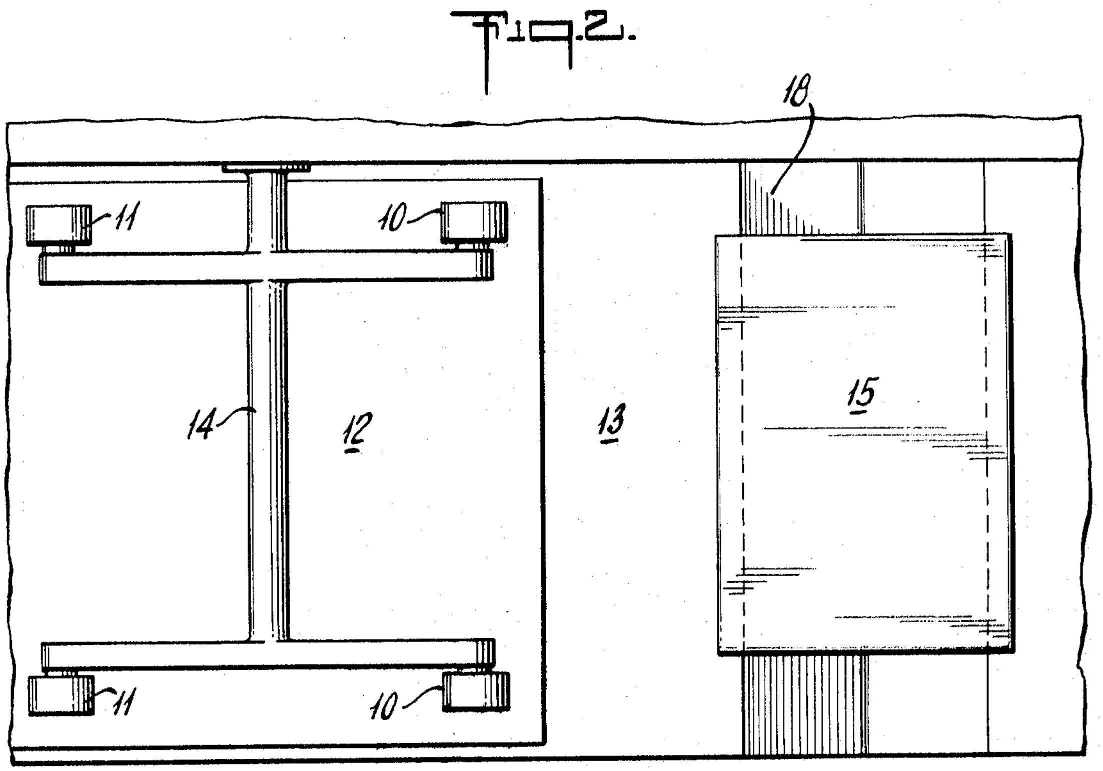
FIG. 2 is a top plan view of the apparatus shown in FIG. 1.

Referring to FIGS. 1 and 2, the magnetic card arrangement shown includes idler rollers 10 and 11 mounted on arm 14 which engage the card 12 and form a pinch drive between these rollers and driven rollers 10' and 11'. The rollers feed the card past fixed magnetic transducer head 15 at a high rate of speed. Preferably, the head 15 has a generally tapered surface which contacts the card. Typically many cards are fed consecutively under the transducer head and magnetic code marks on each card are read by the transducer which produces an electrical output that is representative of the particular information on the card. A more complete description of the information processing system of a type particularly well suited for the practice of this invention is described in a copending application, Ser. No. 823,054, filed May 8, 1969 and assigned to the same assignee as this invention.

The transducer head 15 is located such that the clearance *t* between it and machine bed 13 is equal to the thickness of a card. The cards 12 are relatively stiff and the transducer head must be in contact with the cards for the magnetic marks to be read reliably. Necessarily, then, there is no clearance between the card and the head and a damaged card may easily jam the machine. To prevent this, a recess 18 is formed in the machine bed immediately below the transducer head.

A card, being relatively stiff, bridges the gap formed by the recess so that the head remains in contact with the card while the card is being read. In the event a card with a bent edge hits against the transducer head, the card is supple enough that the leading edge of the card deflects down into the recess and thereby passes under the head without jamming.

The depth *d* of the recess 18 should be at least equal to twice the thickness of the card 12. The width *w* of the recess 18 should be such that the card bridges the recess 18 before the first column of magnetic characters on the card reaches the transducing gap on the head 15. Stated differently, the width *w* should be slightly less than one-half the distance from the leading edge of the card to the first column of magnetic characters on the card. The length of the recess should be at least the width of the cards being processed. The contour of recess 18 is preferably approximately the same as the contour of head 15.

Although the present invention has been described with respect to specific embodiments, it will be appreciated by one skilled in the art that a variety of changes may be made without departing from the scope of the invention. For example, certain features may be used independently of others and equivalents may be substituted all within the spirit and scope of the invention.

What is claimed is:

1. In a machine for reading magnetic ink code marks on a relatively stiff card, the combination comprising:
   - a magnetic transducer,
   - a machine bed extending under said transducer and spaced therefrom by a distance substantially equal to the thickness of a card,
   - means for translating a card along said bed so that it passes beneath said transducer,
   - a recess in said bed beneath said transducer the length in the direction of card translation of which is less than one-half the distance from a leading edge of said card to the magnetic ink code marks on said card and the length of which in a direction transverse to the direction of card translations is equal to the length of that portion of the card which passes under the transducer,
   - whereby the leading edge of the card can be diverted into said recess and said card bridges said recess before the first column of magnetic characters reaches a transducing gap on said magnetic transducer.

2. In a machine for reading magnetic ink code marks, the combination as in claim 1 wherein the contour of said recess is substantially the same as the contour of said head.

3. In a machine for reading magnetic ink code marks as in claim 2 wherein the depth of said recess is at least equal to twice the thickness of said card.

* * * * *